March 20, 1956     C. H. COLLETT     2,739,018
SPLIT SLEEVE AND METHOD OF MAKING THE SAME
Filed Jan. 27, 1955     2 Sheets-Sheet 1
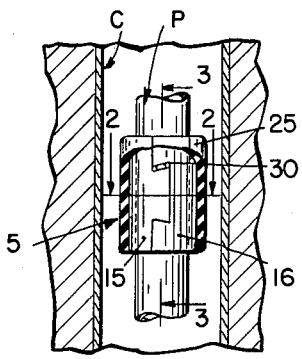
FIG. 1.
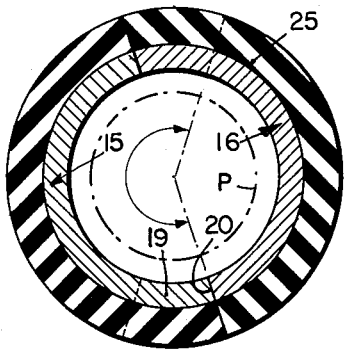
FIG. 2.
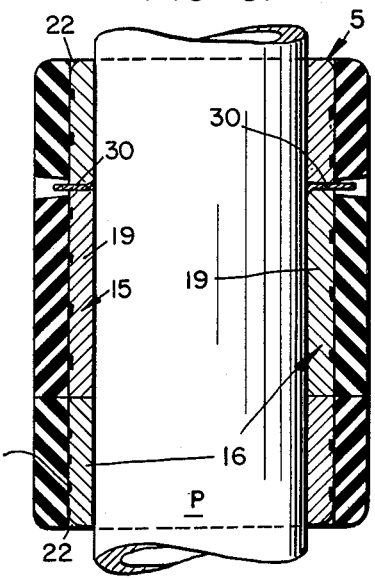
FIG. 3.
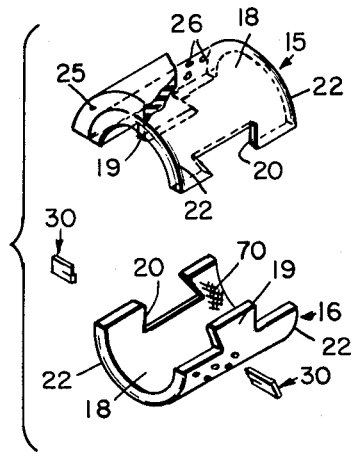
FIG. 4.
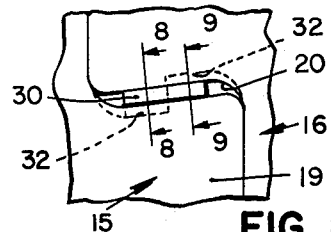
FIG. 7.
FIG. 8.    FIG. 9.
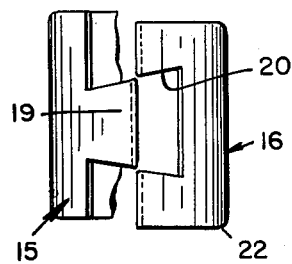
FIG. 5.
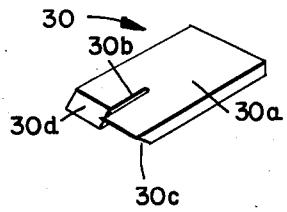
FIG. 6.
INVENTOR
CHARLES H. COLLETT
BY
*Morm & Graham*
ATTORNEYS March 20, 1956  C. H. COLLETT  2,739,018
SPLIT SLEEVE AND METHOD OF MAKING THE SAME
Filed Jan. 27, 1955  2 Sheets-Sheet 2

INVENTOR
CHARLES H. COLLETT
BY
ATTORNEYS

United States Patent Office 2,739,018
Patented Mar. 20, 1956

2,739,018

SPLIT SLEEVE AND METHOD OF MAKING THE SAME

Charles H. Collett, Burbank, Calif., assignor to Bettis Rubber Company, a corporation of California Application January 27, 1955, Serial No. 484,495

11 Claims. (Cl. 308—4)

My invention has generally to do with the art of split sleeves, and while it finds its principal advantageous use as a protective device on drill pipes in the drilling of oil wells and the like, it is also advantageous in other uses such as for collars and bushings.

For instance, it is conventional practice in rotary well drilling to mount on the drill pipe rubber sleeves to prevent frictional wearing engagement of the drill pipe with the well casing, and to center the pipe in the casing, particularly since the drill holes are often crooked. Heretofore it has been the practice to utilize one-piece rubber sleeves which must be stretched and applied axially over the drill pipe, but this is time consuming, requires expensive equipment, and also requires that the pipe lengths be disconnected at the joints. While attempts have been made to provide split sleeves for the purpose, such attempts have not been fully successful for several reasons. One reason is that they are incapable of embracing the drill pipe sufficiently tightly to prevent them from slipping axially of the pipe. Another difficulty with prior art split sleeves has been that they have necessarily been of such construction as to render them incapable of withstanding the tremendous stresses to which they are subjected in normal use. The segments either become separated or the means provided for holding the segments together about the pipe seriously weaken the devices.

It is an object of my invention to provide a split sleeve which is easy to install and remove, which sufficiently tightly embraces the pipe to resist slipping along the pipe, and which is sufficiently strong and durable to withstand all the abuses to which it is subjected in normal usage.

It is a further object to provide a novel method of making a resilient split sleeve.

My invention has additional but more subordinate objects and advantages which will appear hereinafter.

Without intending thereby to limit the broader scope of my invention as defined by the appended claims, I shall now describe what I have found to be presently preferred embodiments thereof, for which purpose I shall refer to the accompany drawings, wherein Fig. 1 is a view partly in section and partly in side elevation, showing one of my split sleeves installed on a conventional drill pipe;

Figs. 2 and 3 are, respectively, enlarged sections taken on lines 2—2 and 3—3 of Fig. 1;

Fig. 4 is a perspective view showing the sleeve segments separated;

Fig. 5 is a side elevation of the segments showing them about to be assembled;

Fig. 6 is a perspective of a locking key which I utilize;

Fig. 7 is a fragmentary plan view showing a wedge in place;

Figure 10:
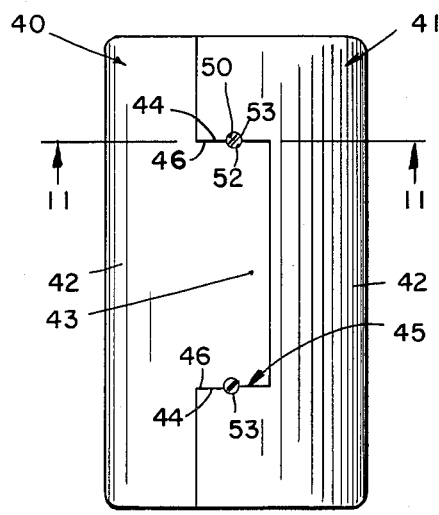
Figure 11:
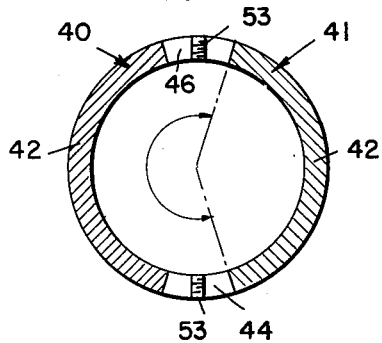
Figure 12:
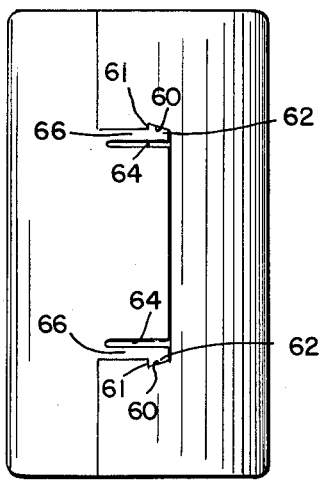
Figure 13:
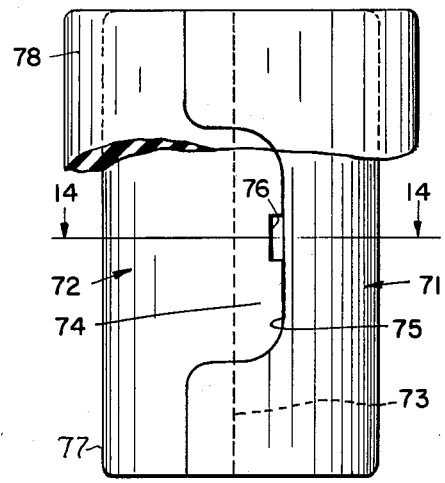

Figs. 8 and 9 are, respectively, sections taken on lines 8—8 and 9—9 of Fig. 7;

Fig. 10 is a side elevation showing a modified form of my split sleeve;

Fig. 11 is a section taken on line 11—11 of Fig. 10;

Fig. 12 is a side elevation of a further modified form of my invention;

Fig. 13 is a side elevation showing another modified form of device; and

Figure 14:
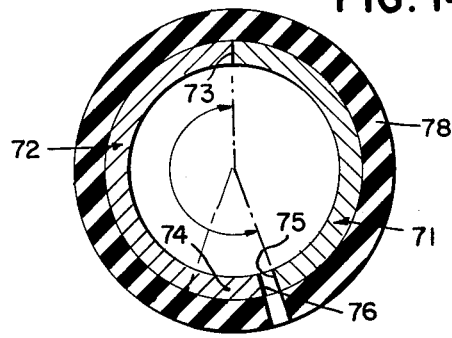

Fig. 14 is a section taken on line 14—14 of Fig. 13.

In general, in carrying my invention into practice, I provide two segments composed of resilient material, preferably suitably heat-treated metal, each of the segments being curved in excess of 180° in cross-section from one side edge to the other, so that each segment must be sprung over the diameter of the drill pipe or other member on which it is to be mounted. However, to enable the two segments, when assembled in opposed relationship about the pipe, to resiliently embrace the pipe about its 360° circumference, I provide for the interengaging or interfitting of contiguous side edge portions of the segments, the interengagement being by means of tongue and slots and being such as to make the circumference of the combined interengaged segments substantially 360°. This interengagement may be provided at each side edge portion or only at one side edge portion of the segments. To insure a tight frictional engagement of the segments about a pipe or drill stem or the like, I make the radius of each segment slightly smaller than the radius of the member onto which it is to fit. I may also provide positive locking means to secure the segments against separation in a circumferential direction. However, I have not found such locking means essential because the resiliency of the segments and the fact that each embraces the pipe in excess of 180° is sufficient to prevent such separation under all normal conditions of use. When I use my split sleeve for the purpose of preventing frictional wear between, for instance, a drill pipe or drill stem and a well casing, I provide each segment with a resilient metal lining and a compressible or soft rubber-like outer covering. However, my split sleeve is adapted for many uses which do not require such covering. For instance, it finds advantageous use as a bushing, sleeve or collar in other fields, and also may be used to great advantage in sealing leaks in fluid lines, because of its ease of application. In the latter use, the sleeve should have a compressible lining.

Referring now to the drawings, in Fig. 1 I show one of my devices, generally denoted 5, installed upon a conventional drill pipe P within a well casing C in a drill hole.

My split sleeve device, in the embodiment of Figs. 1–9, consists of two segments 15, 16. Each segment has a main, semi-circular body portion 18 curved substantially 180°, but not in excess of 180°, while one of its side edges has a circumferential dovetailed extension or tongue 19 curved substantially 30°. The curvature of the body portion plus its tongue is in excess of 180°, but preferably not in excess of 215°—it being my preference that said combined curvature be of the order of 210°. The opposite edge portion of each segment presents a dovetailed slot 20 at least of the depth of the tongue of the other segment. It will be understood, of course, that the tongue 19 of one segment engages in the slot 20 of the other segment initially with a loose fit—that is, the minor length portion of each slot is slightly greater than the major length portion of each tongue, as shown best in Fig. 5. This is to enable the tongue to be circumferentially inserted in the slot. The ends of each segment are preferably rounded as shown at 22. It will be seen that the circumferential extent of each tongue and slot are such that when interengaged, the sleeve produced by the segments is not in excess of 360°.

Each of the segments 15, 16 has an outer covering of soft rubber or compressible material which is bonded to the outer surface of the segment, the outer surface of each segment preferably having a plurality of indentations 26 to facilitate bonding of the rubber covering thereto.

To install the segments upon a drill pipe it is only necessary to apply them to opposite surfaces of the pipe and force them into position wherein each of the tongues 19 enters a slot 20. Since the inner lining of each segment is composed of resilient metal, each segment can be sufficiently sprung to force it over the pipe even though each segment is curved to an extent greater than 180°.

Due to the fact that each segment is curved in excess of 180°, the sleeve, when assembled on the pipe, will sufficiently resist any normal stresses tending to separate the segments. However, as a positive lock, to positively insure the segments remaining in assembly, it is my preference to provide at one end of each slot, between the adjacent end wall of the slot and the adjacent end surface of the interfitting tongue 19, a key 30. As best shown in Figs. 6–9, each key has flat side surfaces 30a and has a medial longitudinal split 30b opening through its inner end portion. The inner end surface 30c at one side of the split is beveled in one direction while the inner end surface 30d at the other side of the split is beveled in the opposite direction (Fig. 6). As best shown in Figs. 7–9, the opposite surfaces of the end wall of the slot 20 and the end wall of the interfitting tongues 19 are each undercut as shown at 32.

Thus, after the segments are assembled on the pipe with the tongues 19 engaging in the respective slots 20, as each key 30 is driven inwardly between the end wall of the slot and the contiguous end surface of the tongue 19, they bend outwardly in opposite directions as the beveled surfaces engage the periphery of the pipe P, as shown in Figs. 8 and 9, preventing escape. It is my preference, although it is not essential, to insert one of the keys 30 into each slot.

When the segments are thus assembled and secured in interlocked position, the key 30 forces the opposite end of the tongue 19 against the opposite end wall of the slot 20, so that said opposite end wall of the slot overhangs the contiguous end wall of the tongue to positively prevent withdrawal of the tongues from the slots in a circumferential direction and consequently to positively prevent separation of the segments when installed on a pipe.

It will be understood, of course, that if my sleeve is to be used simply as a bushing or collar instead of as a drill pipe protector in the boring of a well, the rubber covering 25 may be omitted—the rubber covering being omitted from the device as shown in Fig. 5.

In the embodiment of Figs. 10 and 11, my device consists of two segments 40, 41 each comprising a main body portion 42 which is curved substantially but not in excess of 180°, while one side edge of each segment has a tongue or extension 43 whose end edges 44 are straight or normal to the longitudinal axis of the segment and parallel, while the other side edge of each segment is provided with a slot 45 whose end walls 46 are also straight and parallel. The curvature of each segment, together with its tongue is of the order of at least 210° but preferably not greater than 215°, so that the resilient segments may be sprung over the diameter of the pipe and so that they thus resiliently embrace the pipe. To positively prevent separation of the segments I provide a semi-circular recess 50 in each end wall 46 of each slot and a corresponding semi-circular recess 52 in the contiguous surface 44 of the tongue. The two recesses mate to provide a round hole for the reception of a set screw 53 which is threaded into the hole, or may be threaded into a hole drilled in the drill pipe.

In the embodiment of Fig. 12, the sleeve is as described in connection with Figs. 10 and 11 except that in lieu of the set screws 53 and recesses 50, I provide in each end wall of each slot an undercut 60, providing an inwardly facing shoulder 61 while I provide on each of the tongues, at each end, a protuberance 62 substantially conforming to the shape of the undercut. I also provide circumferentially disposed slots 64 in each tongue adjacent its ends. Thus a pair of resilient portions 66 of each tongue are provided, which enable the tongues to yield sufficiently to be forced into the slot. After the protuberances 62 pass the shoulder 61, the portions 66 flex into normal position to bring the protuberances 62 behind the shoulders 61.

In Figs. 13 and 14 I show another embodiment comprising two segments 71, 72 each of which has one straight side edge 73, the straight side edges abutting each other. Segment 71 is curved in cross-section in excess of 180° but preferably not in excess of 215°, and has in its opposite side edge a circumferentially opening slot 75 of a depth at least equal to the extent to which the curvature of the segment exceeds 180°. The corners of the slot are preferably curved. Segment 72 has a body portion 77 curved in cross-section substantially but not in excess of 180° and has at its opposite side edge portion a circumferentially disposed tongue or extension 74, which extends substantially 30°, or the depth of slot 75 into which it extends. To facilitate removal of the split sleeve from a drill pipe or the like, I provide in the side edge of the tongue 74 a slot 76 into which a tool (not shown) of rectangular cross-section may be inserted and rotated to spring the segments apart. Here, a soft rubber-like outer covering 78 extends about the two segments, the rubber covering extending over the abutting straight side edges 73 to hingedly connect the two segments together at that point, and being split along a line following the opposite side edges of the segments.

In each of the embodiments, the radius of each of the segments should be slightly smaller, preferably approximately 1/16 inch smaller, than the radius of the drill pipe onto which the sleeve is to fit, to insure a snug spring fit.

In making my split sleeve, I first cut steel tubing stock to length and round the end edges. Next I heat treat the cut tubing to spring tension. I next use a flame cutter to cut the tubing into the two segments having the tongues and slots. I cut the tubing into the segments after heat treating because if the tubing were heat treated after the cutting it would tend to flatten out. The interengaging side edge portions of the segments not only prevent relative axial movement of the segments and facilitate positive locking of the segments against relative circumferential separative movement of the segments, but, as illustrated in the drawings, the interengaging side edge portions, which define the extent to which the segments exceed 180° each in curvature, are of substantially the same length. That is, the tongue has an axial length of approximately half the axial length of the sleeve, while those portions of the other segment which bound the ends of the tongue-receiving slot are of approximately equal length and their combined axial length equals approximately the other half of the axial length of the sleeve, so as not only to provide an effective and dependable gripping of the pipe but also to evenly distribute the gripping force.

To further insure that the split sleeve will not slide upon the pipe after being applied thereto, it is my preference to knurl the inner surface of each segment as shown at 70 (Fig. 4).

I claim:

1. The method of making a split sleeve characterized by its ability to resiliently snugly embrace a member of round cross-section in a manner to automatically compensate for any reduction in the original diameter of said member, comprising the sequential steps of providing a length of metallic tubing having a radius of curvature smaller than the radius of curvature of a member which said sleeve is to embrace, heat-treating said length of tubing to spring tension, and then flame-cutting said length of tubing along lines separating it into two segments each curved in cross-section in excess of 180° and having side edge portions which are interengageable to the extent that each segment exceeds 180° in curvature.

2. The method of claim 1 wherein the said provided length of tubing has a radius of curvature substantially 1/16" smaller than the radius of curvature of the member which said sleeve is to embrace.

3. In combination with a drill pipe of cylindrical cross-section, a protector disposed about said pipe in embracing relationship thereto, said protector being characterized by its ability to resiliently, snugly embrace said pipe in a manner automatically to compensate for reduction in the original outside diameter of said pipe, and comprising a pair of opposed, interengaging, spring tensioned, metallic segments each curved in cross-section about a radius smaller than the radius of curvature of the periphery of said pipe, and extending in excess of 180°; one of the side edge portions of the first of said segments having a circumferentially disposed slot presenting an entrance portion opening toward the contiguous side edge portion of the second of said segments, and the said contiguous side edge portion of the said second of said segments having a circumferentially extending, slot engaging tongue portion presenting a leading portion having an axial length not greater than the axial length of said entrance portion of said slot.

4. The combination of claim 3 wherein each of said segments extends not less than 210° but not more than 215°.

5. The combination of claim 3 wherein said slot and said tongue portion are of dove-tail shape and wherein the major axial length portion of said tongue portion is not greater than the minor axial length portion of said slot.

6. The combination of claim 3 which additionally includes locking means interposed between an end of said slot and the contiguous end of said tongue portion.

7. The combination of claim 3 wherein an end wall of said slot and the contiguous end of said tongue portion have registering semi-circular recesses and which additionally includes screw means threaded in said recesses.

8. The combination of claim 3 wherein said slot and said tongue portion are of dove-tail shape, wherein the major axial length portion of said tongue portion is not greater than the minor axial length portion of said slot, wherein an end wall of said slot and a contiguous end of said tongue portion have undercuts, and which additionally includes a key means inserted between said end wall and said end of said tongue portion, said key means having end portions engaging in said undercuts.

9. The combination of claim 3 which additionally includes an outer covering of soft rubber-like material bonded to the outer surface of and covering each of said segments.

10. The combination of claim 3 which additionally includes a layer of soft rubber-like material bonded to the outer surface of said segments, said layer having a portion extending from one of said segments to the other and providing a hinge for said segments.

11. The combination of claim 3 wherein the radius of curvature of each of said segments is 1/16" smaller than the radius of curvature of the periphery of said pipe.

References Cited in the file of this patent

UNITED STATES PATENTS

| | | |
|---|---|---|
| Re. 22,156 | Morris | Aug. 4, 1942 |
| 831,078 | Jottrand | Sept. 18, 1906 |
| 1,613,039 | McLaren | Jan. 4, 1927 |
| 1,614,381 | Moreland | Jan. 11, 1927 |
| 1,785,071 | Coberly | Dec. 16, 1930 |
| 1,863,823 | Barclay | Jan. 21, 1932 |
| 2,464,351 | Shorter | Mar. 15, 1949 |
| 2,594,587 | Riordan | Apr. 29, 1952 |
| 2,604,365 | Howard | July 22, 1952 |

FOREIGN PATENTS

| | | |
|---|---|---|
| 258,808 | Great Britain | Sept. 30, 1926 |